United States Patent [19]

Singh

[11] Patent Number: 4,768,937

[45] Date of Patent: Sep. 6, 1988

[54] TIRE CURING PRESS

[75] Inventor: Anand P. Singh, Youngstown, Ohio

[73] Assignee: NRM Corporation, Columinana, Ohio

[21] Appl. No.: 9,536

[22] Filed: Feb. 2, 1987

[51] Int. Cl.$^4$ ............................................. B29C 35/00
[52] U.S. Cl. ........................................ 425/36; 425/38; 425/44; 425/58
[58] Field of Search ........................ 425/36, 38, 48, 51, 425/58, 44, 45

[56] References Cited

U.S. PATENT DOCUMENTS

| | | | |
|---|---|---|---|
| 2,514,215 | 7/1950 | Stevens et al. | 425/36 |
| 2,834,049 | 5/1958 | White | 425/36 |
| 3,584,335 | 6/1971 | Ulm et al. | 425/36 |
| 3,609,812 | 10/1971 | Baier | 425/38 |
| 4,022,554 | 5/1977 | Macmillan | 425/36 |
| 4,169,698 | 10/1979 | Turk et al. | 425/36 |

Primary Examiner—Willard Hoag
Attorney, Agent, or Firm—Renner, Otto, Boisselle & Sklar

[57] ABSTRACT

A tire curing press for the curing of radial tires includes top and bottom mold sections, relatively movable top and bottom bead rings, the latter being on top of a well, and a center mechanism in the bottom bead ring well. The top mold section includes a sectional mold operator, a top bead ring actuator and an actuator for raising and lowering a chuck for the top bead ring of an uncured tire. The chuck includes a series of horizontal L-shape plates each of which swings about a respective swing axis. An open vertical tube aligned with the top mold section includes a gear at its bottom in mesh with gear segments on the chuck plates so that rotation of the tube opens and closes the chuck. The extent of rotation of the tube controls the extent of the chuck. Such tube is open at the bottom and also serves as an inflation pipe for introducing air pressure into the interior of the uncured tire when the beads thereof are adjacent the mold bead rings for centering the uncured tire and snapping the beads of the tire on the mold bead rings in proper sealed engagement for subsequent closing of the press and shaping of the tire. The actuators for the sectional mold mechanism, the top bead ring, and the raising and lowering of the chuck are arranged in a cascading fashion.

29 Claims, 5 Drawing Sheets

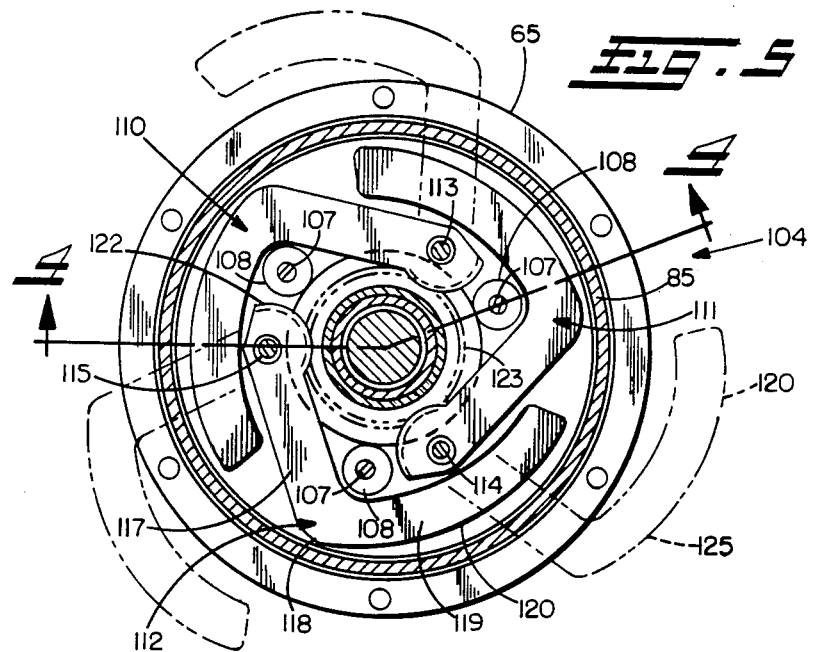
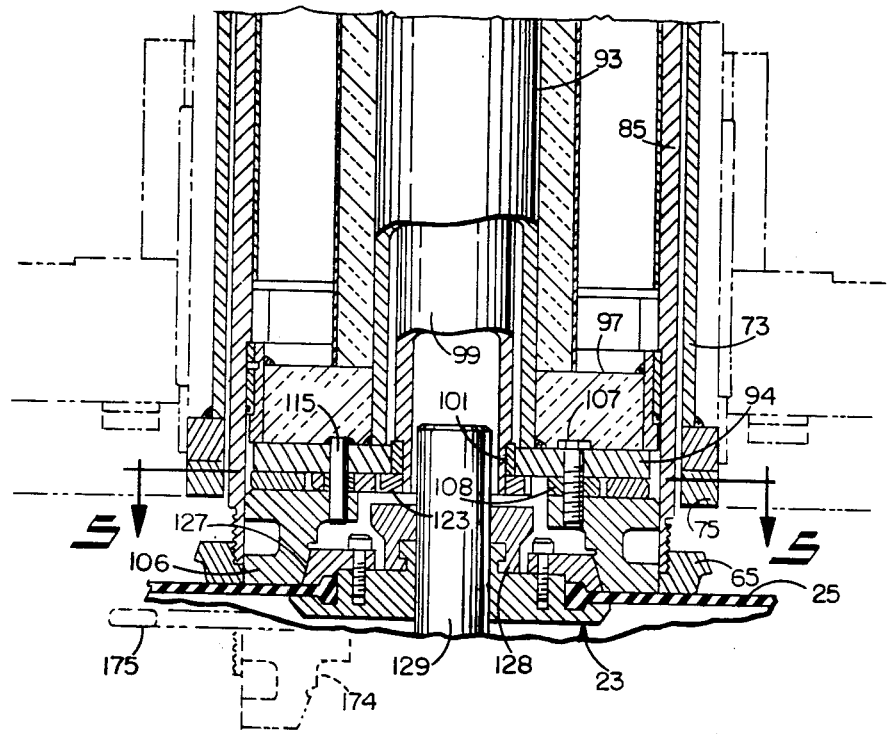

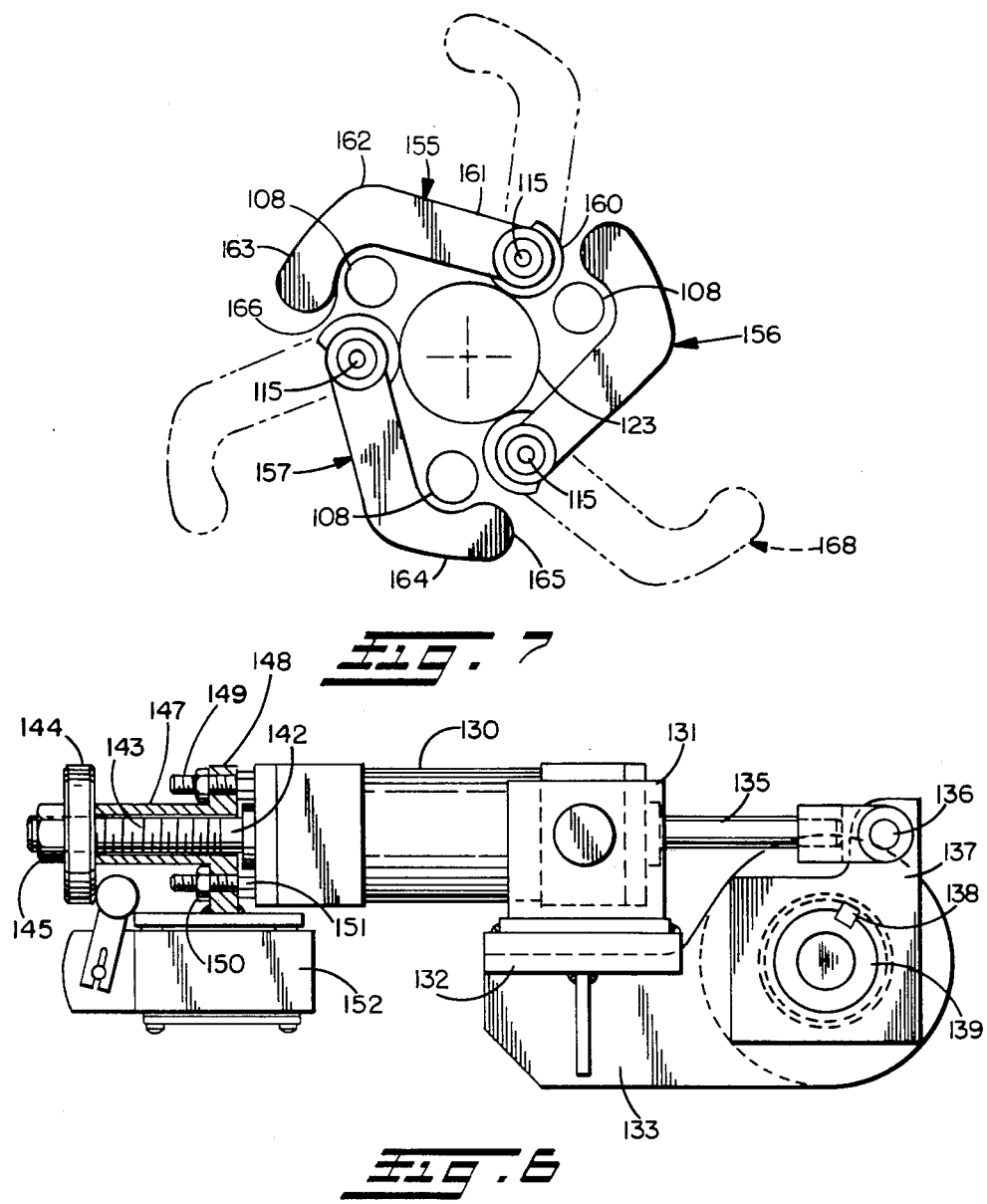

TIRE CURING PRESS

DISCLOSURE

This invention relates generally to tire presses and more particularly to a press utilizing top ring loading.

BACKGROUND OF THE INVENTION

The top loading of tire presses has been developed as a superior manner of introducing uncured tires into a tire press for subsequent shaping and curing. In such process the top bead of the uncured tire is initially brought into close proximity with the top mold bead ring of the press, and, after the loader clears the press, the top mold is brought downwardly until the bottom bead of the uncured tire is in close proximity to the bottom mold bead ring. During this initial transfer of the uncured tire to the top mold bead ring and the lowering of the uncured tire, the tire is held by a chuck in the top mold section. When the tire is in proper position the tire may be air inflated to snap the beads on the mold bead rings. As the press further closes the chuck is retracted into the top mold section and the shaping bladder of the center mechanism is inserted into the tire.

As an illustration of tire presses utilizing such process reference may be had to U.S. Pat. Nos. 4,447,385; 4,444,715; and 4,608,219.

The process and apparatus shown in such patents create some problems. One is the cost and complexity of the chuck within the top mold section, as well as its inability to accommodate tires having different bead diameters with minimal adjustments. If the tooling of the press is changed, the entire chuck may require replacement. Other problems are the strength and compactness of the chuck as well as the ability to use the chuck with any type center or shaping bladder mechanism. Also, with the various actuators on top of the press, the overall height of the press may become excessive and difficult to service.

Further, it has been found that air inflation for centering and seating the beads of the uncured tire on the bead rings of the press may actually cause the tire to move off center if the air pressure inlet is itself not centered with respect to the tire, or if it is too small or too close to the tire envelope.

SUMMARY OF THE INVENTION

A tire curing press for the curing of radial tires includes top and bottom mold sections, relatively movable top and bottom bead rings, the latter being on top of a well, and a center mechanism in the bottom bead ring well. The top mold section includes a sectional mold operator, a top bead ring actuator and an actuator for raising and lowering a chuck for the top bead ring of an uncured tire. The chuck includes a series of horizontal flat L-shaped plates each of which swings about a respective swing axis. An open vertical tube aligned with the top mold section includes a gear at its bottom in mesh with gear segments on the chuck plates so that rotation of the tube opens and closes the chuck. The extent of rotation of the tube controls the extent of the chuck. Such tube is open at the bottom and also serves as an inflation pipe for introducing air pressure into the interior of the uncured tire when the beads thereof are adjacent the mold bead rings for centering the uncured tire and snapping the beads of the tire on the mold bead rings in proper sealed engagement for subsequent closing of the press and shaping of the tire. The actuators for the sectional mold mechanism, the top bead ring, and the raising and lowering of the chuck are arranged in a cascading fashion.

The rotating tube which is the inflation pipe for seating the beads of the tire on the mold bead rings has a substantial inner diameter and the air inlet is at the top of the pipe spaced substantially from the tire envelope. This avoids shocks, jets or air blasts which might tend to move the tire off center.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 4 is a fragmentary vertical section of the chuck of the center assembly as seen from the line 4—4 of FIG. 5;

FIG. 5 is a horizontal section of such chuck as seen from the line 5—5 of FIG. 4, with the chuck shoes shown open in phantom lines;

FIG. 6 is a top plan view taken from the top of the inflation pipe illustrating the actuator and stroke adjustment mechanism for rotating the pipe to open and close the chuck;

FIG. 7 is a schematic illustration of a chuck similar to that of FIG. 5 but with different form tire engaging shoes; and FIG. 8 is a schematic illustration of the mounting in cascade fashion of the vertical actuators for the sectional molds, the top bead ring and the chuck all in the top center assembly.

DETAILED DESCRIPTION OF THE PREFERRED EMBODIMENTS

Figure 1:
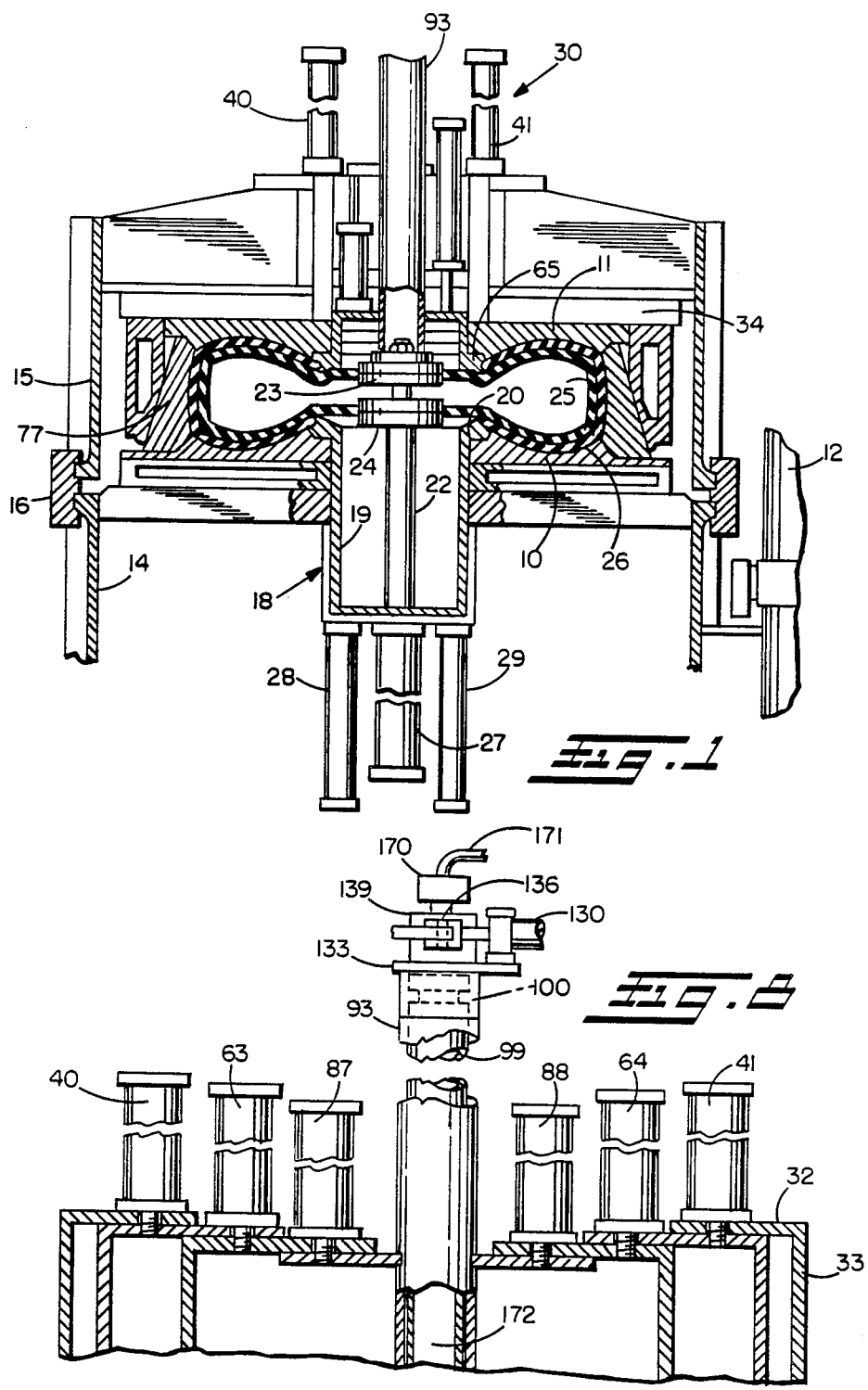
FIG. 1 is a schematic fragmentary vertical section of a tire press in accordance with the invention.

Referring first to FIG. 1 there is illustrated schematically a tire press in accordance with the present invention. The press may comprise a twin cavity press which includes side-by-side cavities each comprising a bottom mold section 10 and a top mold section 11, the latter being moved vertically by a piston-cylinder assembly 12 positioned between the cavities for opening and closing the press. The press includes a bottom cavity 14 which may be mounted on a base and a vertically movable top cavity 15 which, when the press is closed, may be locked to the bottom cavity by an E-shape bayonet lock ring 16. In the center of the bottom mold section there is provided a center mechanism shown generally at 18 which includes a vertically movable well 19, on the top of which is provided the bottom bead or mold ring 20. Positioned within the well is a post assembly 22 on which is mounted top and bottom bladder clamp ring assemblies 23 and 24 which secure the beads of shaping bladder 25. The bladder 25 is shown in its operative position on the interior of tire 26 during the shaping and curing operation.

When not in use or stripped from the tire the clamping rings and the bladder will be withdrawn into the well 19. The post assembly is actuated by the piston-cylinder assembly 27 while the bottom bead 20 is vertically movable through the actuators 28 and 29. Reference may be had to U.S. Pat. No. 4,332,536 for a more detailed illustration of the type of press illustrated schematically in FIG. 1.

In the top center of each mold cavity there is provided a center assembly as shown generally at 30. Although not necessarily illustrated in FIG. 1, the center assembly is a self-contained unit which may be inserted into and removed from the top mold section. The center assembly removably sits on top of the upper inwardly directed flange 32 of annular column 33 of the frame which supports the top platen 34.

Figure 2:
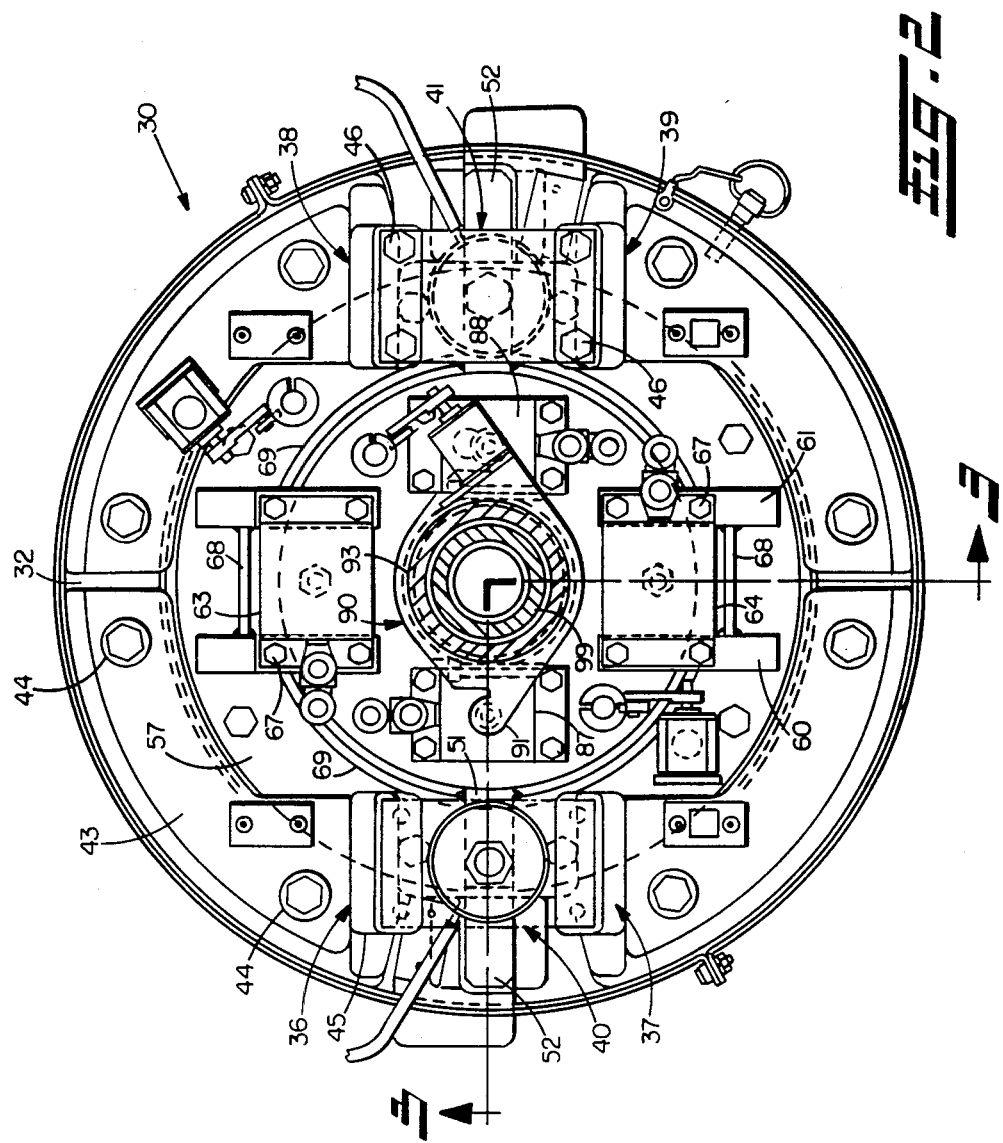
FIG. 2 is an enlarged top view partially in section of the top center assembly of the press.
Figure 3:
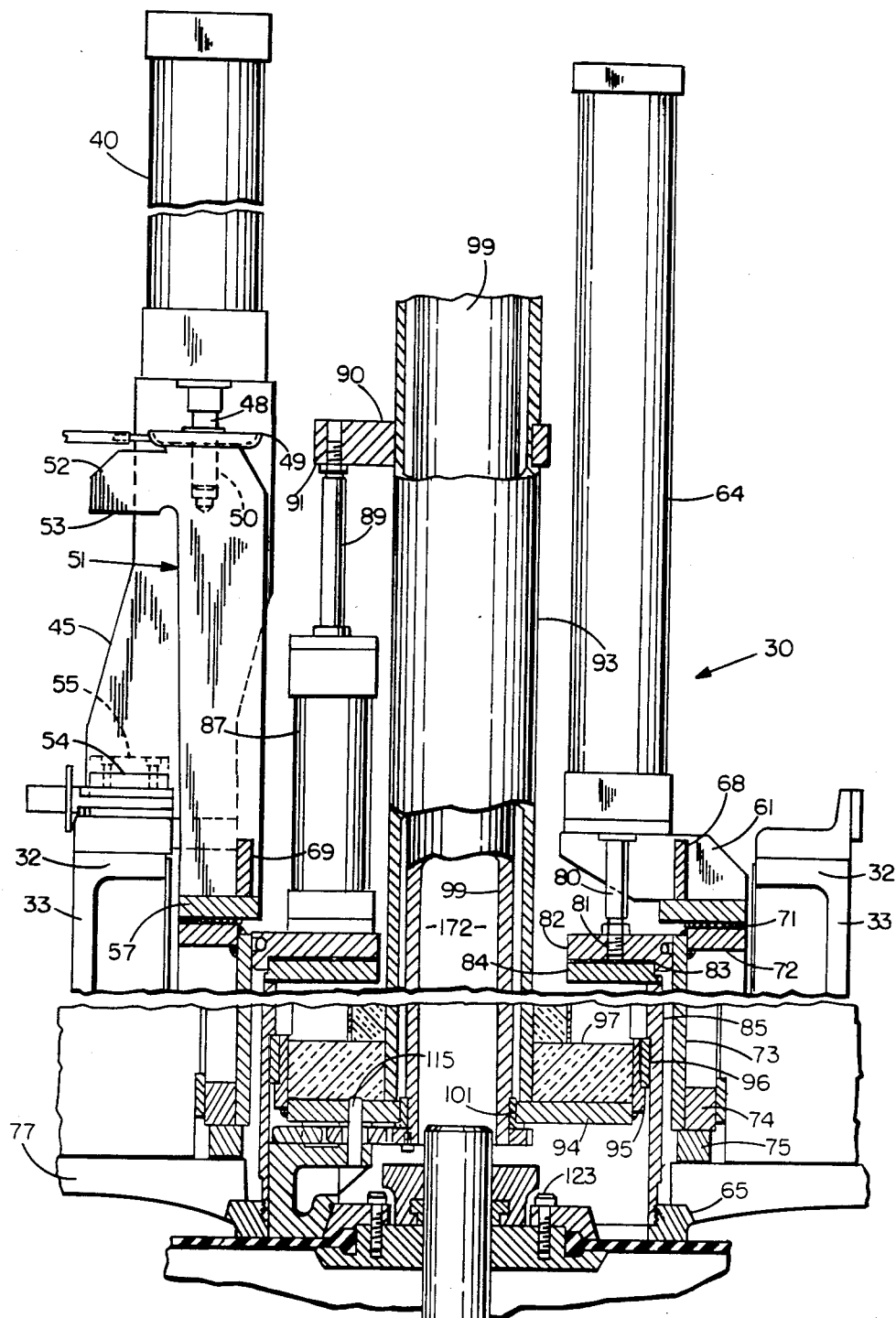
FIG. 3 is a broken vertical section taken substantially from the line 3—3 of FIG. 2.

Referring now to FIGS. 2 and 3 it will be seen that the center assembly includes two pairs of stanchions 36, 37, and 38, 39, which support in elevated position the rod ends of sectional mold actuator piston-cylinder assemblies 40 and 41, respectively. The stanchions 36 and 39 are identical as are the stanchions 37 and 38. Each of the opposed pairs are mirror images of the other. As will be seen, the stanchion 36 includes an arcuate base 43 which is secured by fasteners 44 to the column flange 32. Each stanchion includes an upwardly and slightly radially inwardly extending leg 45. The rod end cap assemblies of the sectional mold actuators 40 and 41 bridge the opposed legs of the paired stanchions and are secured to the tops thereof by the fasteners indicated at 46 in FIG. 2. The rods 48 of each sectional mold actuator as seen in FIG. 3 extend through drip pans 49 to be threadedly secured at 50 to vertical extenders 51. Each extender includes an outwardly offset top portion indicated at 52 which has a lower flat bottom surface 53. Such surface cooperates with stop pad 54 positioned between the stanchion legs 45. The height of the stop 54 may be varied as indicated by the phantom line position 55 and in this manner the stroke of the piston-cylinder assemblies 40 and 41 is controlled.

The lower end of the extensions 51 are secured to ring 57. Ring 57 in turn serves as a support for pairs of brackets 60 and 61 which in turn diametrically support inwardly offset the rod ends of piston-cylinder assemblies 63 and 64 which vertically move the top mold bead ring seen at 65. The piston-cylinder assemblies 63 and 64 are secured to the brackets by the fasteners seen at 67 and each pair of brackets is connected by stiffening plate 68. Cylindrical stiffening plates 69 extend from the extensions to the brackets supporting the piston-cylinder assemblies 63 and 64.

The plate 57 is connected through insulation 71 as seen in FIG. 3 to plate 72 which is in turn secured to ring 74 which has on the lower surface thereof pads 75 which connect the ring and thus the rods of piston-cylinder assemblies 40 and 41 to the top mold section 11. Movement of the top mold section 11 when the press is open or partially open causes the sectional molds indicated at 77 in FIG. 1 to move radially.

The rods 80 of the piston-cylinder assemblies 64 are secured at 81 to ring 82. The ring 82 is secured through insulation plate 83 to ring 84 which is in turn secured to sleeve 85 in turn secured at its lower end to the top mold bead ring 65.

Mounted on the ring 82 is the blind end of piston-cylinder assemblies 87 and 88, the upwardly extending rods 89 of which are connected to yoke 90. The yoke 90 has the profile configuration seen more clearly in FIG. 2 and includes projections 91 to which the rods 89 of the piston-cylinder assemblies 87 and 88 are connected. The yoke 90 is in turn secured to vertically extending tube 93. Tube 93 at its lower end has secured thereto an annular plate 94, to the outer edge of which is secured sleeve 95 which supports a sliding bushing 96 riding against the interior of sleeve 85. Insulation seen at 97 is provided about the plate 94.

Positioned within the tube 93 is a further concentric open tube or pipe 99 which is vertically movable with the tube 93 but journaled for rotation about its vertical axis therein. The inner pipe is supported at its top by a thrust bushing seen at 100 in FIG. 8 and by a sleeve bearing 101 at the bottom on the interior of plate 94. The purpose of the tube 93 and the pipe 99 is to support chuck 104 both for vertical movement and for opening and closing. The hollow interior of the pipe 99 is also employed to inflate the uncured tire to snap the beads on the top and bottom bead rings during the tire loading process.

Referring now additionally to FIGS. 4 and 5 it will be seen that a hub 106 is positioned below the plate 94 and is secured thereto by fasteners 107 extending through spacers 108. As seen in FIG. 5 there are three equally circumferentially spaced such fasteners and spacers. The spacers provide a vertical opening between the plate 97 and the top of the hub in which are flat plate chuck shoes 110, 111 and 112. Each chuck shoe is journaled for oscillation in such vertical or open space between the plate 94 and hub 106 on the respective axes of pins 113, 114 and 115. The pins on which the chuck shoes are journaled for oscillation are also equally circumferentially spaced about the axis of the center assembly.

Each chuck shoe is generally L-shape in configuration and includes a straight arm 117 extending from the journaled proximal connection which then bends almost at 90° as indicated at 118 to terminate in an arcuate elongated leg 119 having an outer curved distal edge 120. The inner end of each shoe is provided with a gear segment seen at 122 concentric with the axis of supporting pin. Each gear segment is in mesh with pinion 123 which is secured to the bottom of the inner tube or pipe 99. With the number of teeth on the pinion a multiple of three, rotation of the tube 99 about its vertical axis will cause the chuck shoes uniformly to extend and retract. Extension of the chuck shoes moves them to the phantom line position seen at 125 in FIG. 5 so that the outer edge 120 underlies the top bead of the uncured tire.

The configuration of the chuck shoes permits the chuck shoes to extend about the spacers 108 in the retracted position and also permits the shoes to overlap radially in the nested or retracted position. The retracted or nested position is of course substantially within the sleeve 85 supporting the bead ring 65. The extended position is substantially radially beyond the bead ring.

It is noted that the hub 106 on its interior includes a conical seat 127 to receive and center the top bladder clamping assembly 23. The hub also clears the nut 128 which secures the clamping assembly to the post 129. The top of the post fits into the open bottom end of the pipe 99.

Rotation of the tube or pipe 99 about its vertical axis to open and close the chuck is obtained from horizontally extending piston-cylinder assembly 130 seen in FIG. 6 and partially in FIG. 8. The piston-cylinder assembly 130 is mounted on trunnion blocks 131 to pivot about a vertical axis. The trunnion blocks are secured by bracket 132 to mounting plate 133 mounted on the top of the outer tube 93. The rod 135 is clevis pivotally connected at 136 to crank arm plate 137 which is keyed at 138 to extension 139 of the inner tube or pipe 99. In this manner extension and retraction of the rod will cause the pipe or tube 99 to rotate about its vertical axis rotating the pinion 123 at the lower end of such tube thus causing the respective chuck shoes to swing uniformly in their horizontal common plane to and from an open and closed position.

The rod 135 of the piston-cylinder assembly extends through the rear or outer end of the cylinder as indicated at 142 and is threaded as seen at 143 to receive an adjustment wheel 144 and a lock nut 145. In the extended position of the piston-cylinder assembly the adjustment wheel 144 abuts against a collar 147. The base of the collar seen at 148 is mounted on threaded studs 149 with adjustment nuts 150 and 151 on each stud adjustably capturing such base. Mounted on the base 148, and of course adjustable therewith, is limit switch 152 which is actuated by the position of the adjustment wheel 144. In FIG. 6, the piston-cylinder assembly 130 is shown extended which in turn extends the chuck shoes and such position may be carefully adjusted.

Referring now to FIG. 7 there is illustrated a chuck having three chuck shoes 155, 156 and 157 which have a somewhat different configuration. Each chuck shoe is journaled at its proximal end on the vertical pin 115 and is provided with a gear segment 160 in mesh with the pinion 123 on the bottom of the inner pipe 99. From the proximal pivot end, each shoe includes a relatively long straight portion seen at 161 which then bends rather sharply as indicated at 162 to terminate in relatively short curved offset leg 163. In this manner the shoe doglegs around the spacer 108. The distal offset portion 163 is provided with a curved outer edge 164 which terminates in a circular edge 165 which slightly widens the distal or tip end of the shoe. The interior edge of the shoe is circular or curved as indicated at 166 to clear the spacer 108. Rotation of the pinion 123 thus moves the shoes from the full line retracted or nested position to the phantom line or open position seen at 168.

Referring now to FIG. 8, it will be seen that on top of the inner pipe extension 139 there is provided a fitting which includes a valve 170 to admit air under pressure from line 171. In this manner air pressure may be admitted to the hollow interior of the pipe 99 during the loading process to snap the beads of the uncured tire onto the top and bottom bead rings 65 and 20, respectively. It will be appreciated that during the later insertion of the bladder, the pipe 99 may be connected to a source of vacuum to minimize air being trapped between the bladder and tire.

FIG. 8 also illustrates schematically the mounting of the various piston-cylinder assemblies of the top center assembly to obtain if desired a cascading effect as the piston-cylinder assemblies extend or retract. The sectional mold actuators 40 and 41 are of course fixed to the center column 33 of the top mold section and as the rods thereof extend to move the top mold section downwardly, the actuators 63 and 64 for the top bead ring 65 also move with the top mold section. As soon as the actuators 40 and 41 have reached the limit of their movement, the actuators 63 and 64 may extend to move the top bead ring 65 downwardly away from the top mold section 11. At the end of the cure cycle this action initially strips the tread sectors from the tire and then the tire from the top mold section. Not only does the extension of the actuators 40 and 41 move the actuators 63 and 64 therewith but also the actuators 87 and 88 and the entire center tube structure 93, 99. Also, when the actuators 63 and 64 are extended to move the top bead ring down, again the actuators 87 and 88 as well as the center tube structure are also moved downwardly. When the cured tire is discharged, the actuators 87 and 88 are then energized to move the center tube structure downwardly. This then moves the chuck assembly to the extended phantom line position seen in FIG. 4 at 174 positioning the chuck shoes below the bead ring 65. In such position both the bead ring and chuck will be extended.

The chuck then vertically enters the top bead of an uncured tire held by a loader, not shown. Rotation of the inner pipe 99 by the piston-cylinder 130 then causes the chuck shoes to extend horizontally as illustrated at 175 in FIG. 4 to be positioned beneath the top bead of the uncured tire. It will be appreciated that in the schematic illustration of FIG. 8, the actuators 87 and 88 extend to move the chuck downwardly while in the illustrated preferred embodiment of FIG. 3 the actuators retract to move the chuck downwardly. The principal of operation is the same. In any event, movement of the top bead ring through the actuators 63 and 64 also moves the chuck vertically, whether or not the chuck is extended and open, or retracted and closed.

Operation

It will be apparent to those skilled in the art that the press may operate in a variety of ways and that the following description is only one such way.

With the press closed as seen in FIG. 1, at the completion of a cure cycle the bladder 25 is withdrawn into the bladder well 19 by retraction of the clamp ring assemblies 23 and 24. To open the press the lock ring 16 is rotated and the upper section of the press is elevated. As the upper section of the press moves upwardly the sectional mold actuators 40 and 41 extend stripping the tire from the tread sectors. Extension of the actuators 63 and 64 strips the tire from the top mold section and elevation of the well and thus the bottom bead ring 20 strips the tire from the bottom mold section 10. When the press is fully open the tire may be resting on the bottom bead ring in an elevated position from which it is unloaded in conventional manner. When the tire is unloaded the press is now clear for loading of the uncured tire.

A loader supporting the tire so that the upper bead is clear positions the tire concentrically between the open mold sections. At this time the actuators 87 and 88 extend the chuck downwardly from the top bead ring to position the chuck shoes beneath or below the upper bead of the uncured tire. Rotation of the pipe 99 causes the chuck shoes to extend horizontally. The entire assembly including the upper bead may now be elevated to clear the uncured tire from the loader. The loader then swings out of the press. At this point the upper bead of the uncured tire is positioned closely adjacent but not seated on the top bead ring 65. The press may then begin to close. With the tire upper bead trapped, the tire will then move downwardly with the upper mold section or bead ring until the lower bead of the uncured tire is closely adjacent the lower bead ring 20. At this point the air valve 170 at the top of the pipe 99 may be opened momentarily to admit a puff of low pressure air which then causes the beads to snap onto the respective upper and lower bead rings 65 and 20. As the press then continues to close the chuck 104 retracts to the nested position of the shoes and the chuck is then elevated to its nested and closed position within the top bead 65. The press continues to close with the top bead 65 moving downwardly in synchronism with the lower bead 20 and during such movement the bladder 25 is inserted into the tire. As the press continues to close the top bead ring 65 seats in the top mold section and the tread sectors 77 close around the tire until the press is fully closed and locked by the ring 16. High pressure curing medium is then admitted to the bladder for the cure of the tire. It will be appreciated that the manner of operation above described may vary as is apparent to those skilled in the art.

In any event there is provided a tire curing press having a top center assembly which is inexpensive and quite compact and strong. Moreover, the inflation of the uncured tire for bead seating purposes occurs through an inlet remotely spaced from the envelope of the tire and centered with respect to such envelope. Further, the top center assembly may be utilized with essentially any type of bladder or center mechanism. As seen in FIGS. 3 and 4, the post 129 of the center mechanism fits within the open chamber 172 in the pipe 99.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

I claim:

1. A tire curing press comprising top and bottom mold sections each having bead rings, means to move said top mold section toward and away from the bottom mold section to open and close the press, a vertically movable tire sealing unit in the top mold section operative to enter the top bead of the tire and expand horizontally to be positioned beneath the top bead of the tire to position the top bead of the tire adjacent the bead ring of the top mold section, whereby the top mold section may then be lowered to bring the tire bottom bead adjacent the bottom mold section bead ring, said tire sealing unit comprising a vertically extending tube positioned coaxially of the press and tire in communication with the interior of the tire so that the tire may be inflated through said tube when the beads thereof are adjacent the respective bead rings thus to seal the tire to such rings.

2. A tire press as set forth in claim 1 including an air inlet at the top of said tube for air inflation of the uncured tire.

3. A tire press as set forth in claim 1 including means to move said chuck and top bead ring vertically concurrently and vertically with respect to each other.

4. A tire press as set forth in claim 3 wherein said last mentioned means comprises piston-cylinder assemblies arranged for sequential cascading operation.

5. A tire press as set forth in claim 4 wherein said means to move includes a sectional mold actuator.

6. A tire press as set forth in claim 1 wherein said sealing unit includes a chuck comprising coplanar horizontal chuck plates, and means to move said chuck plates radially beneath the bead ring of the top mold section.

7. A tire press as set forth in claim 6 wherein said chuck plates swing about respective vertical axes to move radially.

8. A tire press as set forth in claim 7 including means to rotate said tube to swing said chuck plates.

9. A tire press as set forth in claim 8 including a horizontally oriented piston-cylinder assembly at the top of said tube to rotate said tube.

10. A tire press as set forth in claim 9 including adjustable stop means to limit the stroke of said horizontally oriented piston-cylinder assembly to limit the opening extent of said chuck plates.

11. A tire curing press comprising top and bottom mold sections each having bead rings, means to move said top mold section toward and away from the bottom mold section to open and close the press, a vertically movable tire sealing unit in the top mold section operative to enter the top bead of the tire and expand horizontally to be positioned beneath the top bead of the tire to position the top bead of the tire adjacent the bead ring of the top mold section, whereby the top mold section may then be lowered to bring the tire bottom bead adjacent the bottom mold section bead ring, said tire sealing unit comprising a vertically extending tube positioned coaxially of the press and tire in communication with the interior of the tire so that the tire may be inflated through said tube when the beads thereof are adjacent the respective bead rings thus to seal the tire to such rings, said sealing unit including a chuck comprising coplanar horizontal chuck plates, and means to move said chuck plates radially beneath the bead ring of the top mold section, said chuck plates swinging about respective vertical axes to move radially, and means to rotate said tube to swing said chuck plates including a pinion on the bottom of said tube, and gear segments on each chuck plate in mesh with said pinion.

12. A tire press as set forth in claim 11 wherein each chuck plate includes an offset distal end whereby the proximal end of one chuck plate nests within the distal end of an adjacent chuck plate when said chuck plates are retracted.

13. A tire press as set forth in claim 12 wherein each distal end includes a curved outer edge.

14. A tire press as set forth in claim 11 including top and bottom plates between which said coplanar chuck plates move, and spacers holding said top and bottom plates in spaced relationship.

15. A tire press as set forth in claim 14 wherein each chuck plate includes an offset distal end whereby the distal end of each chuck plate extends around a spacer when retracted.

16. A tire press as set forth in claim 15 wherein said top and bottom plates fit axially within the top bead ring when the chuck is retracted.

17. A tire press as set forth in claim 16 wherein each chuck plate includes a distal curved edge which fits axially within the top bead ring when the chuck is retracted.

18. A tire press comprising top and bottom mold sections, the top mold section being movable toward and away from the bottom mold section to open and close the press, a chuck in the top mold section operative to engage the top bead of an uncured tire initially to load the uncured tire into the top mold section, said chuck comprising a plurality of coplanar chuck plates, means to swing said chuck plates about respective vertical axes to open and close the chuck, said chuck including a vertically extending hollow pipe positioned concentrically with the top and bottom mold sections, an air inlet at the top of said pipe to inflate the uncured tire when the beads thereof are adjacent the bead rings of the top and bottom mold sections, and means to rotate said pipe about its vertical axis to swing said chuck plates including a pinion on the bottom of said pipe, and gear segments on each chuck plate in mesh with said pinion.

19. A tire curing press as set forth in claim 18 including a horizontally oriented piston-cylinder assembly at the top of said pipe to rotate said pipe.

20. A tire press as set forth in claim 19 including adjustable stop means to limit the stroke of said horizontally oriented piston-cylinder assembly to limit the opening extent of said chuck plates.

21. A tire curing press as set forth in claim 18 wherein said top mold section includes a vertically movable top bead ring, and means to move said chuck and top bead ring vertically concurrently and vertically with respect to each other.

22. A tire press as set forth in claim 21 wherein said last mentioned means comprises piston-cylinder assemblies arranged for cascading operation.

23. A tire press as set forth in claim 22 wherein said means to move includes a sectional mold actuator.

24. A tire press as set forth in claim 18 wherein each chuck plate includes an offset distal end whereby the proximal end of one chuck plate nests within the distal end of an adjacent chuck plate when said chuck plates are retracted.

25. A tire press as set forth in claim 24 wherein each distal end includes a curved outer edge.

26. A tire press as set forth in claim 25 including top and bottom plates between which said coplanar chuck plates move, and spacers holding said top and bottom plates in spaced relationship.

27. A tire press as set forth in claim 26 wherein each chuck plate includes an offset distal end whereby the distal end of each chuck plate extends around a spacer when retracted.

28. A tire press as set forth in claim 27 wherein said top and bottom plates fit axially within the top bead ring when the chuck is retracted.

29. A tire press as set forth in claim 28 wherein each chuck plate includes a distal curved edge which fits axially within the top bead ring when the chuck is retracted.

* * * * *